United States Patent [19]
Nakamura

[11] Patent Number: 6,109,220
[45] Date of Patent: Aug. 29, 2000

[54] MARINE ENGINE

[75] Inventor: Mitsuyoshi Nakamura, Iwata, Japan

[73] Assignee: Yamaha Hatsudoki Kabushiki Kaisha, Japan

[21] Appl. No.: 08/717,763

[22] Filed: Sep. 23, 1996

[30] Foreign Application Priority Data

Sep. 22, 1995 [JP] Japan .................................. 7-26 9072

[51] Int. Cl.[7] .................................................. F02B 75/18
[52] U.S. Cl. .................................. 123/41.28; 123/41.31; 60/321; 440/89
[58] Field of Search ............................. 123/41.01, 41.28, 123/41.31, 41.29, 41.82 R; 440/88, 89; 60/320, 321

[56] References Cited

U.S. PATENT DOCUMENTS

| | | | |
|---|---|---|---|
| 1,277,735 | 9/1918 | La Porte | 123/41.31 |
| 1,321,482 | 11/1919 | Sigmun | 123/41.29 |
| 1,680,567 | 8/1928 | Pitzman | 123/41.28 |
| 4,401,061 | 8/1983 | Matsushita et al. | |
| 4,972,807 | 11/1990 | Morishita | 123/41.82 R |
| 4,991,546 | 2/1991 | Yoshimura | |
| 5,048,467 | 9/1991 | Kojima | |
| 5,067,448 | 11/1991 | Nakase et al. | 123/41.31 |
| 5,154,654 | 10/1992 | Yamazaki et al. | 440/88 |
| 5,212,949 | 5/1993 | Shiozawa | 60/321 |
| 5,251,577 | 10/1993 | Kojima | |
| 5,531,620 | 7/1996 | Ozawa et al. | |
| 5,769,038 | 6/1998 | Takahashi et al. | |

FOREIGN PATENT DOCUMENTS 2178712  2/1987  United Kingdom ..................... 440/88

*Primary Examiner*—Noah P. Kamen
*Attorney, Agent, or Firm*—Knobbe, Martens, Olson & Bear, LLP

[57] ABSTRACT

A two-cycle, multi-cylinder engine maintains roughly equal temperatures between cylinders, despite differing exhaust efficiencies between the cylinders. Several ways of reducing the temperature of one of the cylinders in comparison to the other are disclosed. One embodiment involves supplying more coolant to the cooling passages around the hotter running cylinder. Other ways involve reducing the compression ratio or retarding ignition timing in the hotter running cylinder in comparison to the other cylinder.

14 Claims, 8 Drawing Sheets

MARINE ENGINE

BACKGROUND OF THE INVENTION

1. Field of the Invention

The present invention relates to a method and device for reducing the temperature in a hotter running cylinder of a multi-cylinder marine engine.

2. Description of Related Art

Personal watercrafts have become popular in recent years. This type of watercraft is quite sporting in nature and is designed to carry a rider and possibly one or two passengers. A relatively small hull of the personal watercraft commonly defines a rider's area above an engine compartment.

An internal combustion engine frequently powers a jet propulsion unit which propels the watercraft. The engine lies within the engine compartment in front of a tunnel formed on the underside of the watercraft hull. The jet propulsion unit is located within the tunnel and is driven by a drive shaft. The drive shaft commonly extends between the engine and the jet propulsion device, through a wall of the hull that forms a front gullet portion of the tunnel.

Personal watercrafts often employ an in-line, multi-cylinder, crankcase compression, two-cycle engine, usually including two or three cylinders. The engine conventionally lies within the engine compartment with the in-line cylinders aligned along a longitudinal axis of watercraft hull (in the bow-stern direction).

An exhaust manifold typically couples the exhaust ports of the engine cylinders to an exhaust system. The exhaust manifold usually includes several of runners. Each runner communicates with an exhaust port of one of the engine cylinders. The runners merge together at a downstream point and communicate with an exhaust pipe of the exhaust system at a common end. The length of the runners commonly differ in prior exhaust manifolds.

The exhaust system discharges exhaust byproducts from the watercraft. The exhaust system commonly includes a water jacket which cools at least a portion of the exhaust system. At least a portion of the cooling water usually is introduced into the exhaust stream after an expansion chamber of the exhaust system to further silence exhaust noise and for discharge from the watercraft.

One of the cylinders often runs hotter than the other cylinders in prior marine engines. For instance, in a two cylinder engine, the first cylinder usually runs hotter than the second cylinder. This occurs in part because of exhaust gas flow differences between the cylinders. The exhaust flow differences between the cylinders is largely attributable to the differences in length and shape of the exhaust manifold runners.

The first cylinder, which exhausts into the exhaust manifold upstream of the second cylinder, usually has better scavenging. As a result, more complete combustion occurs first cylinder than in the second cylinder. The first cylinder thus produces more power and heat. A temperature difference consequently results between the cylinders.

Elevated operating temperature of one cylinder commonly causes the engine to knock. The high temperature also tends to deteriorate rubber products which are located near the engine or exhaust manifold. For example, vibration-attenuating rubber engine mounts, which are usually located near the exhaust manifold, may deteriorate due to high operating temperature of the engine and the exhaust manifold.

Pressure fluctuations, which normally occur in the exhaust system, may cause the exhaust gas to carry some cooling water upstream and into the cylinders. The backflow water tends to evaporate in a cylinder which has a higher operating temperature that the other cylinder. Evaporation can prove problematic where precipitates (e.g., salt) remain and cylinder. Under server condition, salt can corrode the piston and even lead to seizure of the piston within the cylinder.

SUMMARY OF THE INVENTION

A need therefore exists for a way of maintaining a generally uniform temperature between the cylinders even where exhaust gas flow differs between the cylinders.

An aspect of the present invention involves a multi-cylinder engine for a small watercraft. The watercraft comprises a first variable-volume combustion chamber and a second variable-volume combustion chamber. An exhaust manifold communicates with both the first and second combustion chamber. Means are provided for reducing the temperature of the first variable-volume combustion chamber in comparison to the second variable-volume combustion chamber.

In accordance with another aspect of the present invention, a multi-cylinder engine for a small watercraft is provided. The engine comprises a first variable-volume combustion chamber and a second variable-volume combustion chamber. An exhaust manifold communicates with both the first and second combustion chambers. The first variable-volume combustion chamber exhausts into the exhaust manifold upstream of the point where the second variable-volume combustion chamber exhausts into the exhaust manifold. A cooling system includes at least a first coolant passage near the first variable-volume combustion chamber and a second coolant passage near the second variable-volume combustion chamber. A flow regulator of the cooling system produces a larger coolant flow rate through the first coolant passage than through the second coolant passage.

A preferred method of maintaining generally equal temperatures within at least two cylinders of a multi-cylinder engine involves cyclically providing a fuel/air charge to first and second cylinders of the engine and burning the fuel/air charge in the first cylinder and in the second cylinder. Combustion byproducts are ported to an exhaust manifold such that the first cylinder exhausts upstream of the second cylinder. The operating temperature in the first cylinder is reduced to generally match or to be lower than the temperature of the second cylinder during the cyclic operation of the engine.

BRIEF DESCRIPTION OF THE DRAWINGS

These and other features of the invention will now be described with reference to the drawings of a preferred embodiment which is intended to illustrate and not to limit the invention, and in which.

DETAILED DESCRIPTION OF THE PREFERRED EMBODIMENT

Figure 1:
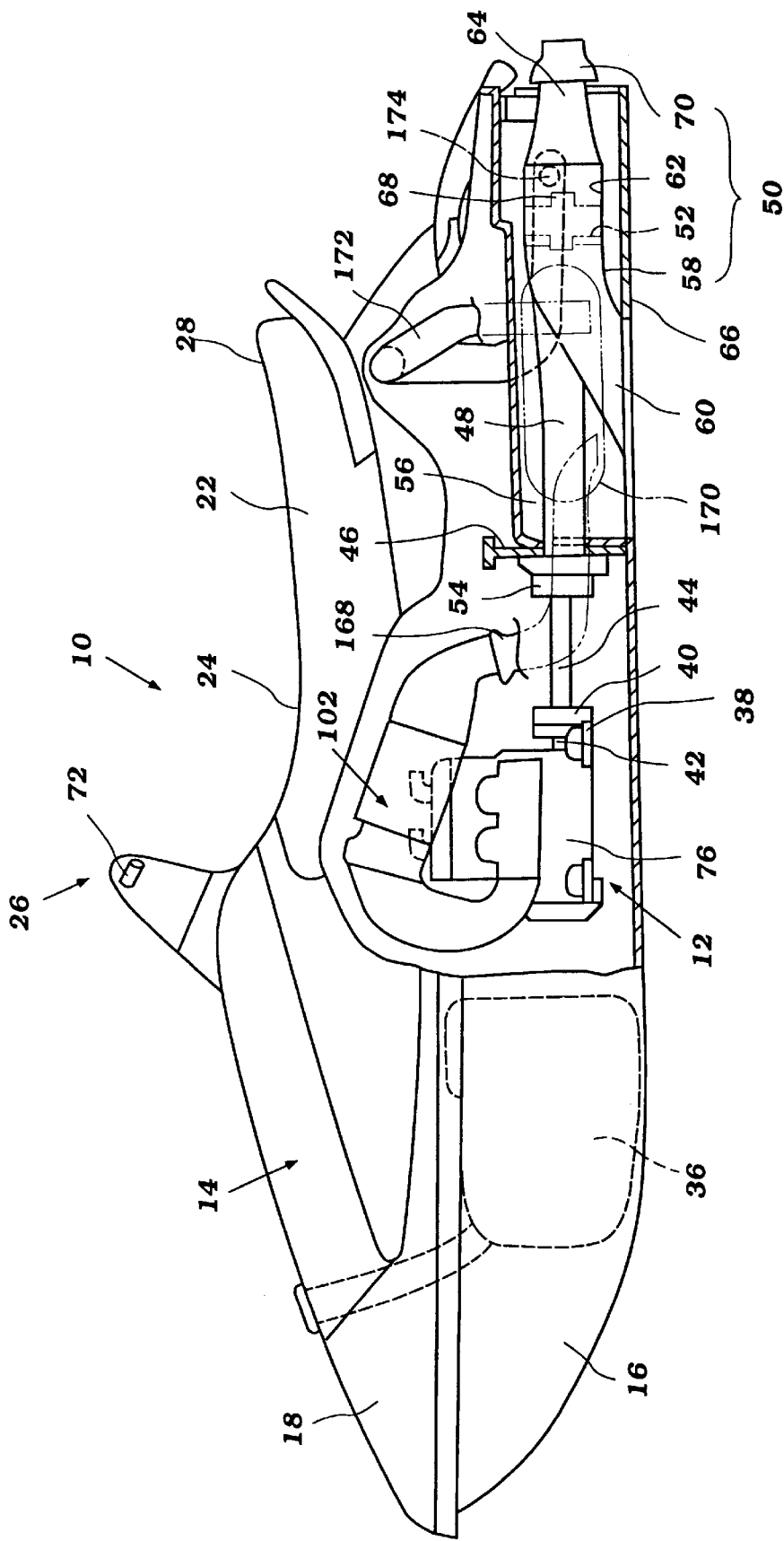
FIG. 1 is a partial sectional, side elevational view of a personal watercraft which employs a marine engine which is configured in accordance with a preferred embodiment of the present invention.

FIG. 1 illustrates a personal watercraft 10 which includes a marine engine 12 configured in accordance with a preferred embodiment of the present invention. Although the present engine 12 is illustrated in connection with a personal watercraft, the engine 12 can be used with other types of watercraft as well, such as, for example, but without limitation, small jet boats and the like.

Before describing the engine 12, an exemplary personal watercraft 10 will first be described in general details to assist the reader's understanding of the environment of use and the operation of the engine 12. The watercraft 10 includes a hull 14 formed by a lower hull section 16 and an upper deck section 18. The hull sections 16, 18 are formed from a suitable material such as, for example, a molded fiberglass reinforced resin. The lower hull section 16 and the upper deck section 18 are fixed to each other around the peripheral edges 20 in any suitable manner.

A passenger seat 22 is provided proximate to the stern of the hull 14. The passenger seat 22 is mounted longitudinally along the center of the watercraft 10. In the illustrated embodiment, the seat 22 has a longitudinally extended straddle-type shape which may be straddled by an operator and by at least one or two passengers. A forward end 24 of the seat 22 lies proximate to the controls 26 of the watercraft 10 which generally lie at about the longitudinal center of the watercraft 10. This position of the operator on the watercraft 10 gives the watercraft fore and aft balance when the operator rides alone. A rear portion 28 of the seat 22 is configured to allow one or two passengers to be comfortably seated behind the operator of the watercraft 10. The seat 22 desirably includes a removable seat cushion to increase the comfort of the operator and the passengers.

The upper deck section 18 of the hull 14 advantageously includes foot areas. The foot areas extend generally longitudinally and parallel to the sides of the elongated seat 22 so that the operator and any passengers sitting on the seat 22 can place their feet in the foot areas. A non-slip surface (not shown) is located in the foot areas to provide increased grip and traction for the operator and the passengers.

The lower hull section 16 of the personal watercraft 10 includes a forward compartment 32 and a rear compartment 34. In the exemplary watercraft depicted in FIG. 1, a fuel tank 36 and a buoyant block (not illustrated) are located in the forward compartment 32. The buoyant block affords additional buoyancy to the watercraft 10.

The engine 12 is contained within the rear compartment 34 and is mounted primarily beneath the forward portion of the seat 22. Vibration-absorbing engine mounts 38 secure the engine 12 to the hull lower portion 16 in a known manner. The engine 12 is mounted in approximately a central position in the watercraft 10.

As seen in FIG. 1, a coupling 40 interconnects an engine output shaft 42 to an impeller shaft 44. If the engine output shaft 42 is vertically disposed, the impeller shaft 44 will be driven through a bevel gear transmission or a similar transmission.

The propeller shaft 44 extends rearwardly through a bulkhead 46, and a protective sleeve 48, to a jet propulsion unit 50 and drives an impeller 52 of the unit 50. A bearing assembly 54, which is secured to the bulkhead 46, supports the impeller shaft 44 behind the shaft coupling 40.

The jet propulsion unit 50 is positioned in a tunnel 56 in the rear center of the lower hull section 16 located behind the bulkhead 46. The propulsion unit 50 includes a gullet 58 having an inlet opening 60 formed on the bottom side of the lower hull section 16. The gullet 58 extends from the inlet opening 60 to a pressurization chamber 62. The pressurization chamber 62 in turn communicates with a nozzle section 64 of the propulsion unit 50. A ride plate 66 covers a portion of the tunnel 56 behind the gullet inlet 60 to enclose the pump chamber 62 and the nozzle 64 within the tunnel 56. In this manner, the lower opening of the tunnel 56 is closed by the front edge of the pump gullet 58 and the ride plate 66.

The impeller 52 is located toward the front end of the chamber 62. A central support 68 supports the rear end of the impeller shaft 44 behind the impeller 52 and generally at the center of the pressurization chamber 62. A bearing assembly journals the rear end of the impeller shaft 44 within the support 64.

The rotating impeller 52, which the impeller shaft 44 drives, pressurizes the water within the chamber 62 and forces the pressurized water through the nozzle section 64 of the propulsion unit 50. A steering nozzle 70 directs the exit direction of the water stream exiting the jet propulsion unit 50. The steering nozzle 70 is pivotally supported at the rear of the jet propulsion unit 50 to change the thrust angle on the watercraft 10 for steering purposes as is known in the art.

The steering nozzle 70 is connected to a steering handle 72. The steering handle 72 forms part of the operator controls 26 which are mounted in front of the operator seat 22 as noted above. The steering handle 72 also can include a throttle control for controlling the speed of the engine 12.

The personal watercraft 10 so far described is conventional and represents only an exemplary watercraft on which the present engine 12 can be employed. A further description of the personal watercraft 10 therefore is not believed necessary for an understanding and an appreciation of the present invention. The details of the engine 12, including its exhaust system, will now be described in detail.

With reference to FIGS. 1 through 5, the engine 12 desirably is a multicylinder internal combustion engine. In the illustrated embodiment, the engine 12 includes two in-line cylinders and operates on a two-stroke, crankcase compression principle. For ease of discussion, the cylinders are generally reference by reference numeral 73, with a first cylinder of the cylinders 73 being referenced by reference numeral 73a and a second cylinder being referenced by reference numeral 73b. The engine 12 is positioned such that the row of cylinders 73 lies parallel to a longitudinal axis of the watercraft 10, running from bow to stern. This engine type, however, is merely exemplary. Those skilled in the art will readily appreciate that the present engine principals can be used with any of a variety of engine types having other number of cylinders, having other cylinder arrangements and operating on other combustion principles (e.g., four-stroke principle).

The engine 12 includes a cylinder block assembly 74 that defines a pair of parallel cylinder bores formed by cylinder liners. Each cylinder liner is cast or pressed in place in a cylinder block. Pistons (not shown) reciprocate within the bores and are rotatably journaled about the small ends of connecting rods by means of piston pins. The big ends of the connecting rods in turn are journaled about throws of the crankshaft 42.

A crankcase member 76 is attached to the lower end of the cylinder block assembly 74 and forms a two crankcase chambers at the lower ends of the cylinder bores. The crankshaft 42 is rotatably journaled within crankcase chambers.

As has been noted, the engine 12 operates on a two-cycle crankcase compression principle. As is typical with such engines, the crankcase chambers associated with each of the cylinder bores are sealed relative to each. For this purpose, the crankshaft 42 can include sealing disks. These disks are disposed on the throws of the crankshaft 42 and separate the big ends of adjacent connecting rods.

Within the cylinder block 74, an exhaust passage is formed which communicates with each cylinder 73. Each exhaust passage extends from an exhaust port formed in the side of the cylinder wall to an exhaust discharge port located on the side of the engine block 74.

One or more scavenge passages (not shown) also are formed within each cylinder. Each passage includes an inlet port which is disposed in the lower end of the bore and opens to the crankcase chamber, and an outlet port which is disposed at a longitudinal position along the bores that is slightly below and on the opposite side of the exhaust passage and opens to each of the bores.

A cylinder head assembly 78 is affixed in closing relation to the upper ends of the cylinder bores by any suitable means. The cylinder head assembly 78 defines a pair of recess which cooperates with the bores and heads of the pistons to form combustion chambers, whose volume varies cyclically with the motion of the pistons.

A spark plug 80 is mounted atop each of the recesses in the cylinder head assembly 78 and has its gap extending into the combustion chamber. The spark plugs 80 are fired by an ignition control circuit (not shown) that is controlled by the ECU.

A fuel/air charge is delivered to the crankcase chambers by an induction system 82. In the illustrated embodiment, the induction system 82 is located on a side of the engine 12. An air intake silencer 84 is located above the engine 12 and includes a downwardly-facing inlet opening 86. The inlet opening 86 opens into at least one plenum chamber within the silencer 84.

The plenum chamber of the silencer 84 communicates with a plurality of charge formers 88. The engine 12 desirably includes a number of charger formers 88 equal to the number of cylinders 73 of the engine 12.

In the illustrated embodiment, the charger formers 88 are floatless-type carburetors; however, it is understood that other types of charge formers, such as, for example, fuel injectors, also can be used with the engine 12.

Each carburetor 88 includes a throat in which a throttle valve is disposed. A throttle shaft supports each throttle valves in the respective carburetor throat. The throttle shafts are coupled to a throttle operator in a known manner.

A venturi is located upstream of the throttle valve within the carburetor throat. A floatless fuel metering device supplies fuel to a fuel opening within the venturi. The air flow through the venturi draws the fuel through the hole to form the fuel/air charge delivered to the respective combustion chambers.

The floatless fuel metering device of each carburetor desirably includes a diaphragm pump 90 which is driven by pressure fluctuations in the associated crankcase chamber. The carburetors 90 are arranged such that the diaphragm pumps 90 lie on a side of the carburetors 88 opposite of the engine block 74. This arrangement provides a simplified fuel piping layout. Conduits thus connect the diaphragm pumps 90 with the associated crankcase chamber to convey pressure pulses within the chamber to the respective pump 90.

The diaphragm pump 90 draws fuel into a pump chamber through a check valve. The fuel is then metered through a second check valve through a second fuel line to a deliver chamber (not shown) located on the opposite side of the throttle throat. The pump 90 controls the movement of fuel in to and out of the pump chamber, in a known manner.

The rate at which fuel is delivered into the delivery chamber is controlled, at least in part by a needle valve operated by a conventional throttle control. Fuel delivered to the delivery chamber is subsequently introduced into the incoming air stream so as to create a fuel/air mixture. In particular, a diaphragm is mounted in the delivery chamber and divides the chamber into an atmospheric area and a fuel storage area. When the second check valve of the pump chamber closes, the diaphragm moves toward the throttle throat to force the fuel through a delivery tube that opens at the fuel opening in the venturi.

A fuel supply system delivers a continuous flow of fuel to the pump chamber of the diaphragm pump 90. The fuel supply system also removes excess fuel from the carburetors. For this purpose, the fuel supply system includes a fuel supply line 92 and a fuel return line 94. Both the fuel supply line and the fuel return line communicate with the fuel tank 36 and with parallel branches of a fuel circuit that lie between the supply line 92 and the return line 94. The carburetors 82 are positioned within these parallel branches.

The fuel/air charge formed within the carburetor 82 is delivered to the corresponding crankcase chamber through an intake passage of an intake manifold 96. In the illustrated embodiment, the intake manifold 96 lies below the carburetors 82. Each intake passage of the intake manifold 96 communicates with the outlet of one of the carburetors 82.

Upward motion of the piston of each cylinder 73 draws atmospheric air and fuel from the respective carburetor 82 through the induction passage and into the crankcase chamber, past the reed valve. The reed valve is open at this point, because the pressure in the induction passage is greater than the pressure in the crankcase chamber.

Sometime after the piston passes top dead center (TDC), the pressure in the crankcase chamber exceeds the induction passage pressure, and the reed valve closes. The air-fuel mixture in the crankcase chamber is then compressed by the piston during its down stroke until the outlet port of the scavenge passage is exposed to the combustion chamber. At this point the compressed air-fuel mixture enters the combustion chamber through the scavenge passage and is further compressed by the ensuing compression stroke of the piston.

At some point before top dead center (TDC), the spark plug is fired by the ECU, and the air-fuel mixture ignites, burns, and expands. This forces the piston downwardly, and thus drives the crankshaft 42. Continued downward motion of the piston exposes the exhaust passage to the combustion chamber, and thus permits the combustion gases to be expelled from the combustion chamber through the exhaust passage.

A conventional magneto-flywheel assembly 98 desirably triggers the ignition timing. The magneto-flywheel assembly 98 is connected to the crankshaft 42 on the front side of the engine 12. A pulsar coil used with the magneto-flywheel assembly 98 produces a signal indicative of a particular crankshaft angle. The signal pulse desirably is received and processed by the ECU to determine the specific crankshaft angle at any given time.

The ECU uses this information to control ignition timing. For this purpose, the ECU includes an ignition controller which cooperates with a capacitor discharge ignition circuit (CDI). A charging coil used with the magneto-flywheel assembly 98 desirably charges the CDI circuit. The discharge of a CDI capacitor generates a voltage in an ignition coil associated with each spark plug. The ECU normally instructs the ignition system to fire the spark plugs at a certain degree before top-dead-center (e.g., 20 degrees); however, the ignition timing can be retarded or advanced.

An exhaust manifold 100 is attached to the opposite side of the engine 12 and communicates with the exhaust discharge ports associates with each cylinder 73. The exhaust manifold 100 delivers exhaust byproducts to an exhaust system 102 for discharge, as described below.

With reference to FIGS. 6 through 11, the exhaust manifold 100 desirably includes a numeral of runners 104 equal to the number of cylinders. In the illustrated embodiment, the exhaust manifold includes two runners 104. For ease of description, the runner associated with the first cylinder will be referenced by reference numeral 104a and the runner associated with the second cylinder will be referenced by reference numeral 104b.

Each runner extends from a mounting flange 106. The mounting flanges 106 are attached to the side of the engine block 74 by conventional means opposite of the induction system 82. In this position, the exhaust ports of the first and second cylinders 73 communicate with the passages 108, 110 through the first and second runners 104a, 104b, respectively.

The exhaust passage 108 defined by the first runner 104a has an elongated shape with a gradual 90E bend which smoothly transitions into a straight section 112. The exhaust passage 110 terminates at an outlet 114. An attachment flange 116 is formed about the outlet 114.

The exhaust passage 110 defined by the second runner 104b merges into the exhaust passage 108 through the first runner 104a. The second cylinder 73b thus ports into the exhaust manifold 100 downstream of the point where the first cylinder 73a ports into the exhaust manifold 100. The second runner passage 110 is significantly shorter than the first runner passage 108. The flow axis through the second runner passage 110 also takes an abrupt directional change where the two runners merge.

Figure 9:
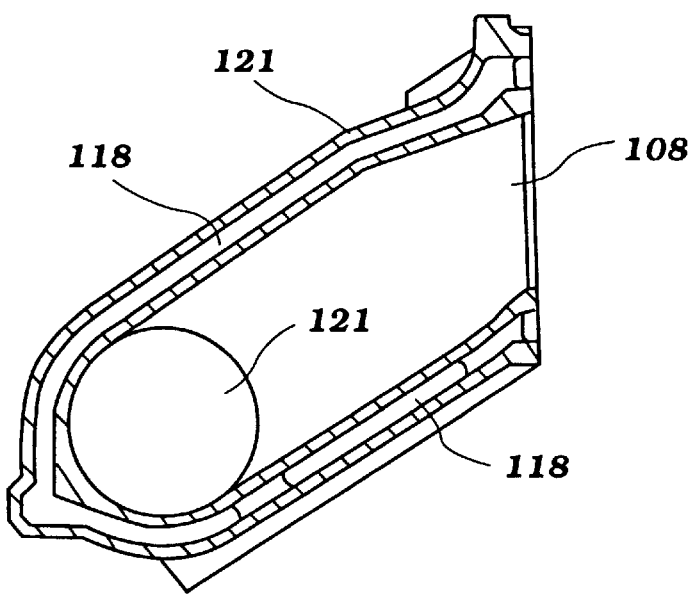
FIG. 9 is a cross-sectional view of the exhaust manifold of FIG. 6 taken along line 9—9.
Figure 10:
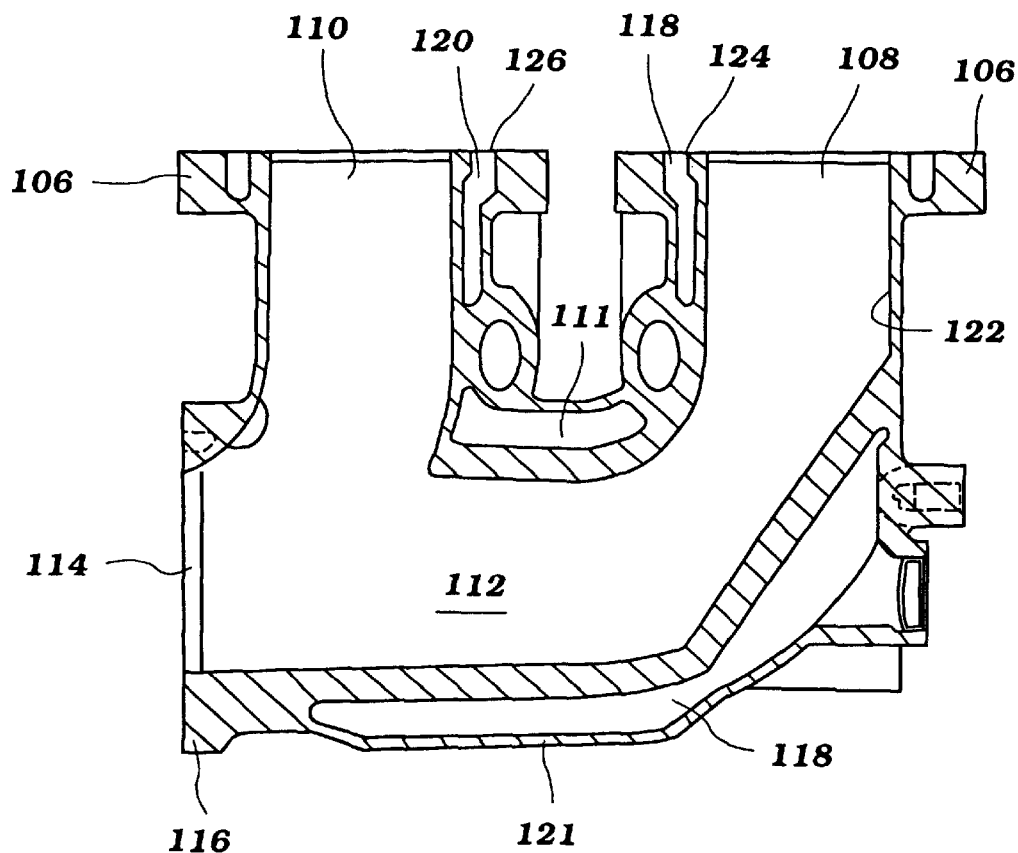
FIG. 10 is a cross-sectional view of the exhaust manifold of FIG. 7 taken along line 10—10.
Figure 11:
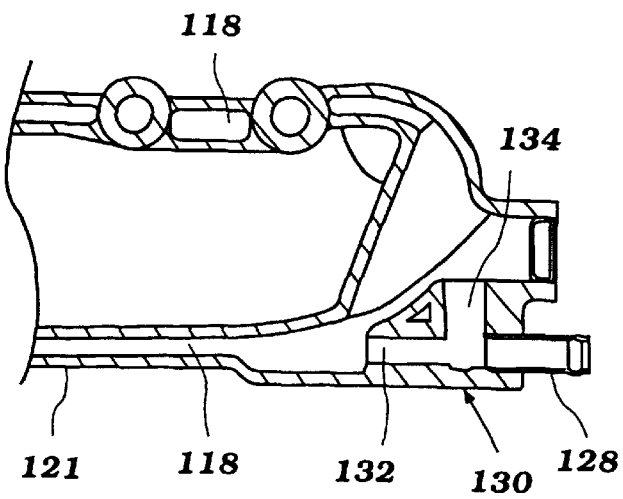
FIG. 11 is a cross-sectional view of the exhaust manifold of FIG. 7 taken along line 11—11.

A coolant jacket surrounds the exhaust manifold 100. The coolant jacket includes a plurality of passages 118, 120 which are formed in the walls 121 of the exhaust manifold 100 adjacent to the runner passages 108, 110. As best seen in FIGS. 9 through 11, the coolant passages 118 about the first runner 104a have a significantly greater volume that the coolant passages 120 about the second runner 104b. The coolant passage 118 extends about an entire initial segment 122 of the first passage runner 104a and communicates with a larger passage 118 that lies about the outer radius of the first runner passage 108.

The coolant passages 118 about the first runner passage 108 extend up to outlet opening 124 formed in the mounting flange 106. The outlet openings 124 communicate with coolant passages in the cylinder block 74 that lie near the first cylinder 73a.

The coolant passages 120 about the second runner passage 110 also extend up to outlet passages 126 formed in the mounting flange 106 of the second runner 104b. These outlet openings 126 communicate with coolant passages in the cylinder block 74 that extend next to the second cylinder 73b.

A coolant inlet port 128 desirably is formed on the lower rear end of the exhaust manifold 100. The inlet desirably communicates with the coolant passages 118, 120 that surround the first runner passage 108 as well as those that surround the second coolant passage 110.

A flow regulator 130 operates between the two sets of coolant passages 118, 120 to restrict coolant flow into the coolant passages 120 that extend along a portion of the second runner passage 110. That is, the flow regulator 130 directs more coolant flow into the coolant passages 118 that surround the first runner passage 104a.

In the illustrated embodiment, the flow regulator 130 includes a restriction in the passage 132 from the inlet to the coolant passages 120 of the second runner 104b. The restriction desirably has a smaller diameter than the passage 134 that leads to the coolant passages 118 of the first runner 104a. In this manner, more coolant flows through the passages that lie near the first cylinder 73a than through the coolant passages that lie near the second cylinder 73b.

Figure 4:
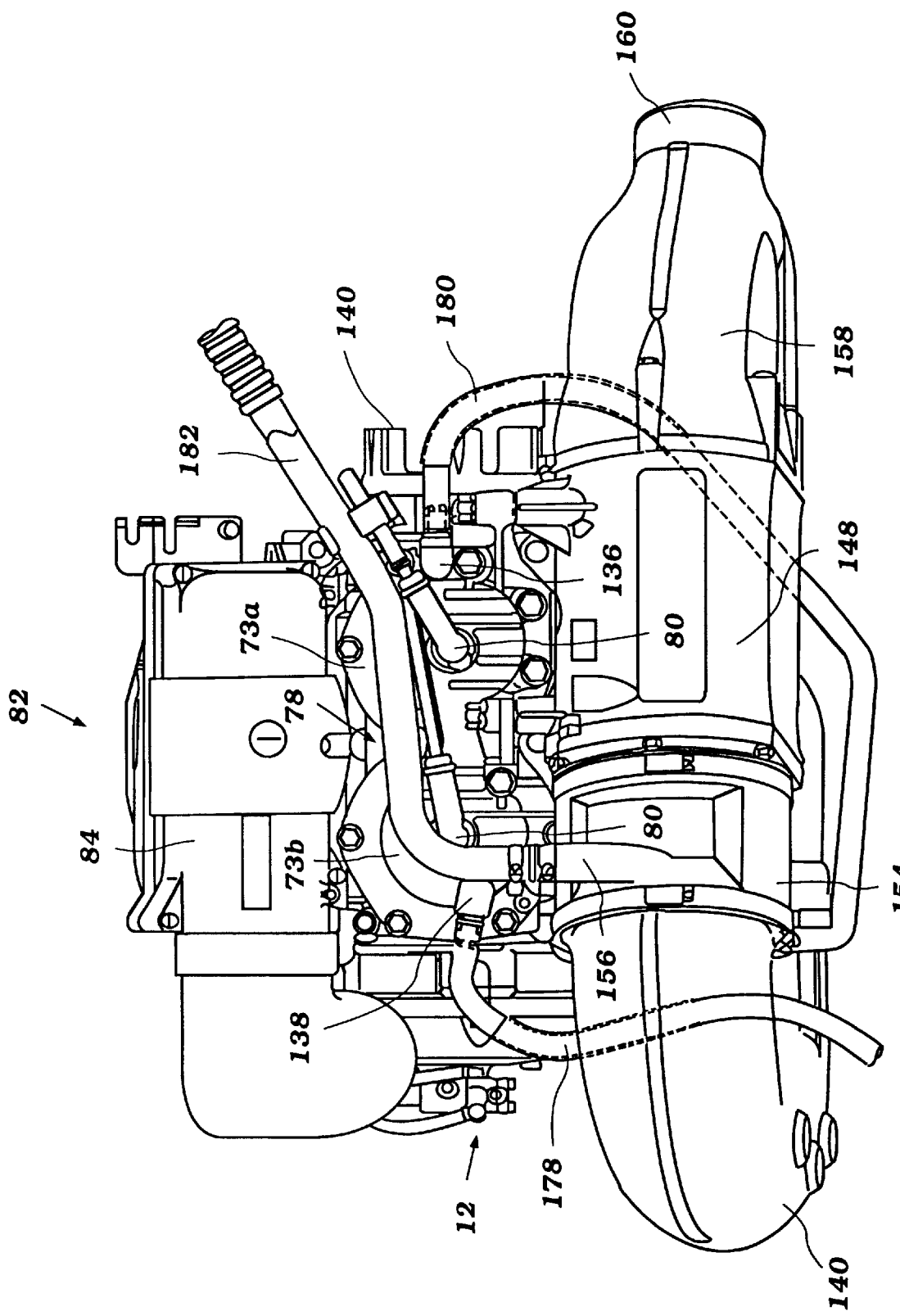
FIG. 4 is a top plan view of the engine of FIG. 2.
Figure 5:
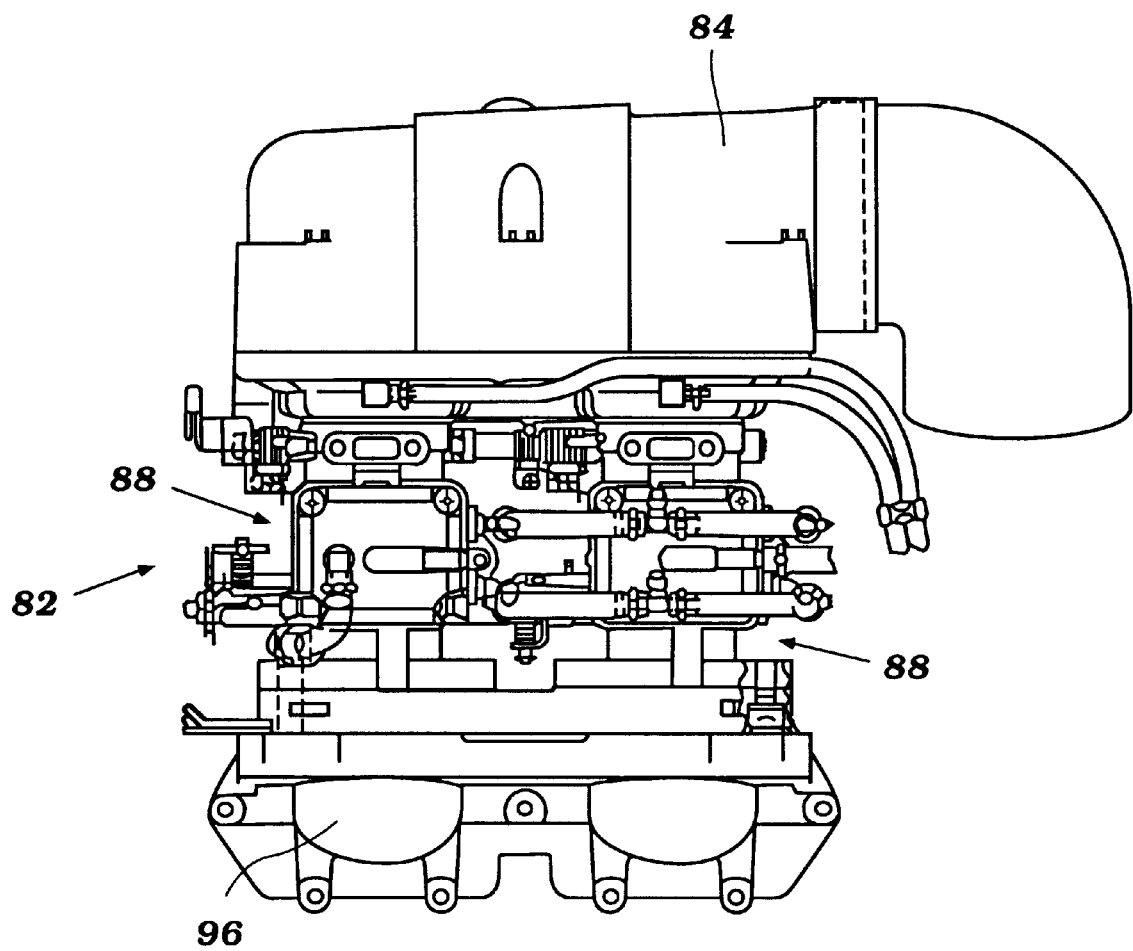
FIG. 5 is a side elevational view of the engine of FIG. 3 taken in direction V.
Figure 6:
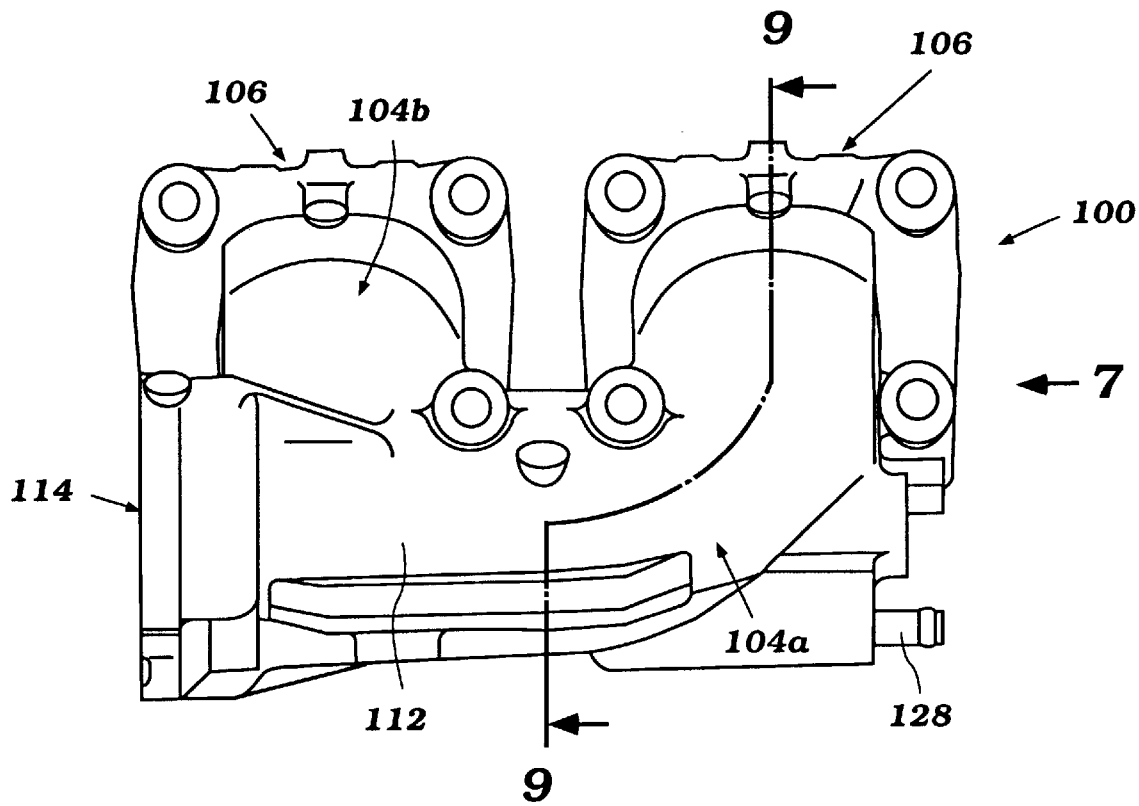
FIG. 6 is an enlarged side view of an exhaust manifold of the exhaust system illustrated in FIG. 2.
Figure 7:
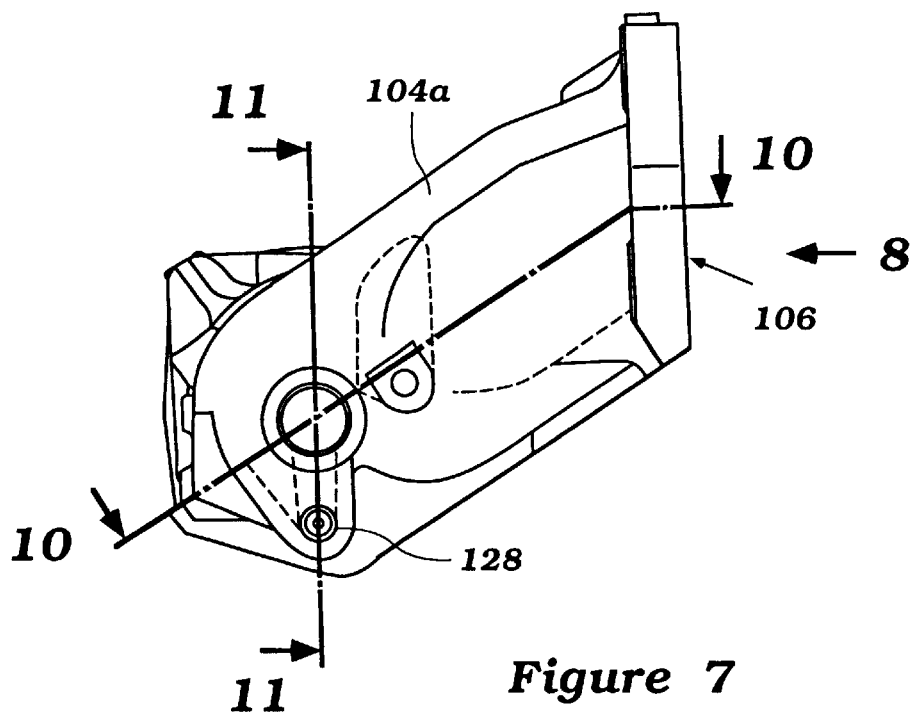
FIG. 7 is a rear elevational view of the exhaust manifold of FIG. 6 taken in direction VII of FIG. 6.
Figure 8:
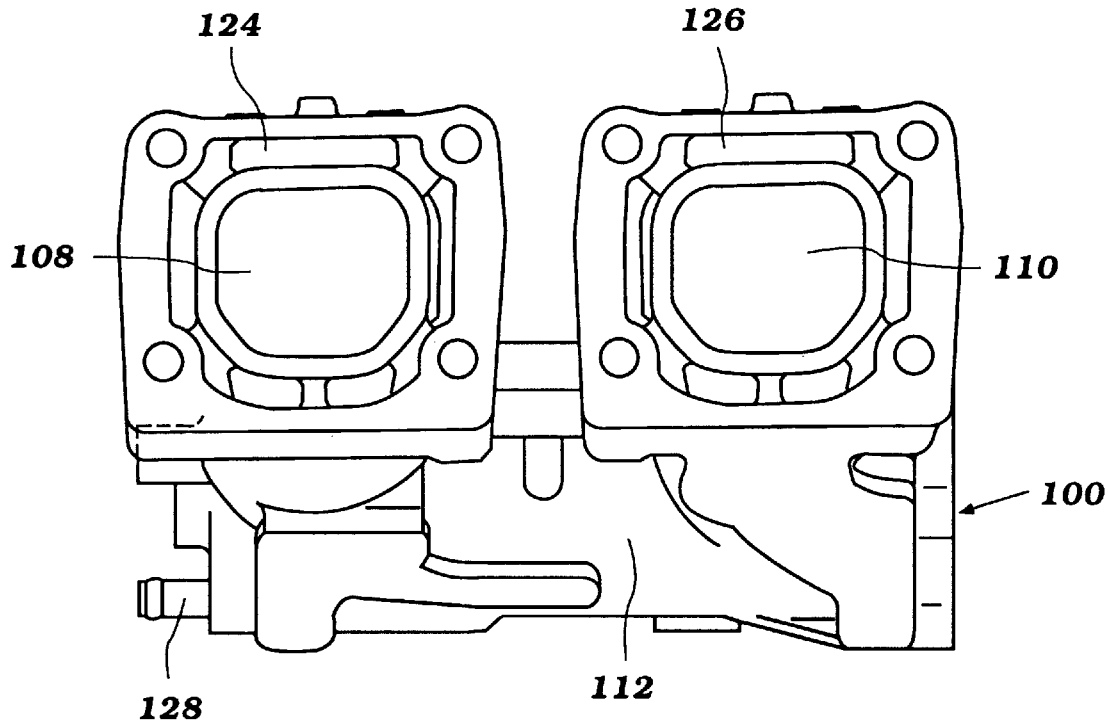
FIG. 8 is an opposite side view of the exhaust manifold of FIG. 6 taken in direction VIII of FIG. 7.

With reference to FIG. 4, the coolant passages in the engine block that lie near the first cylinder 73a terminate at a common first outlet port 136. Likewise, the coolant passages in the engine block that lie near the second cylinder terminate at a common second outlet port 138.

Figure 2:
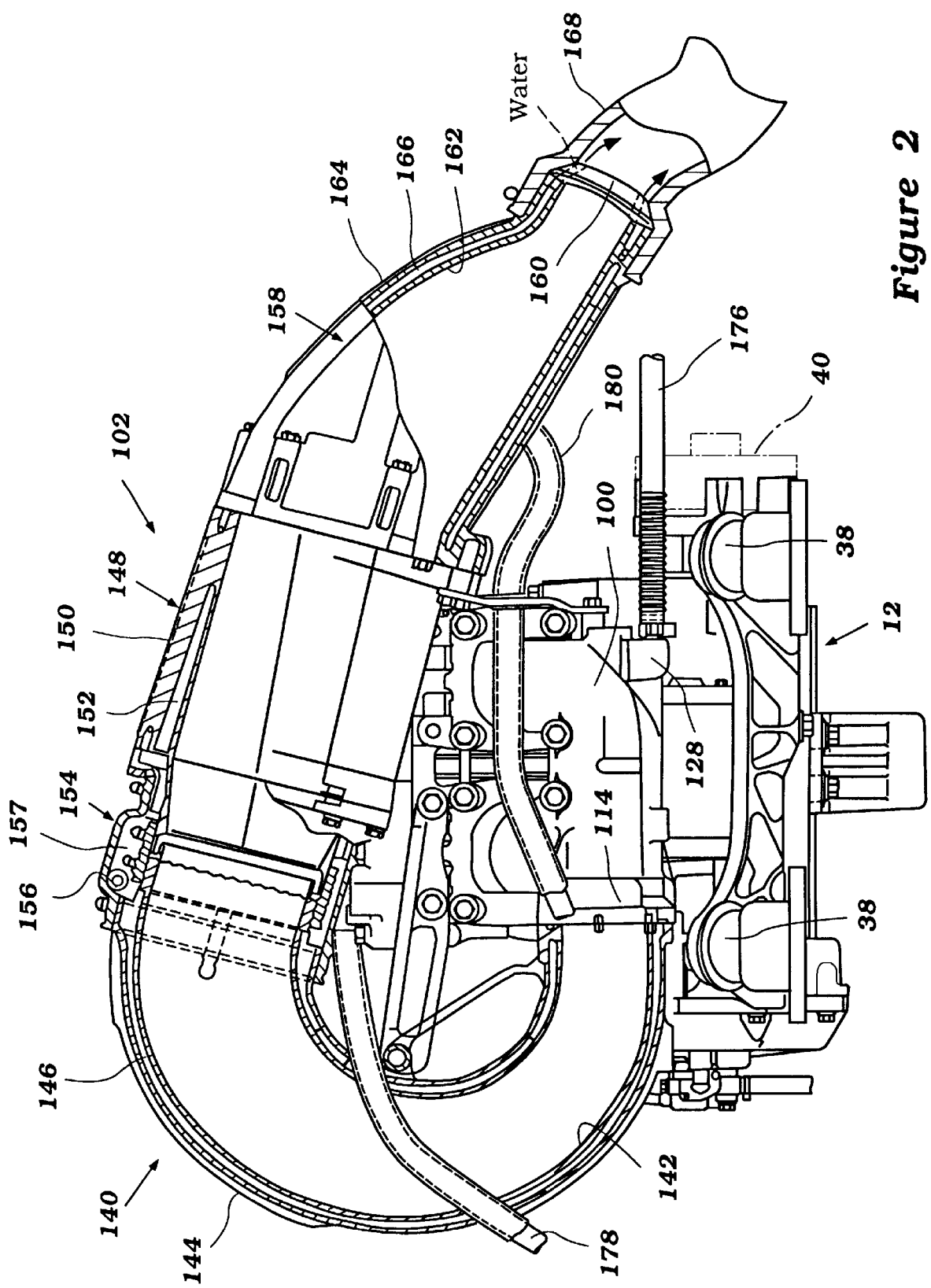
FIG. 2 is a partial, sectional side elevational view of an engine of the watercraft of FIG. 1, illustrating a portion of an exhaust system in section.
Figure 3:
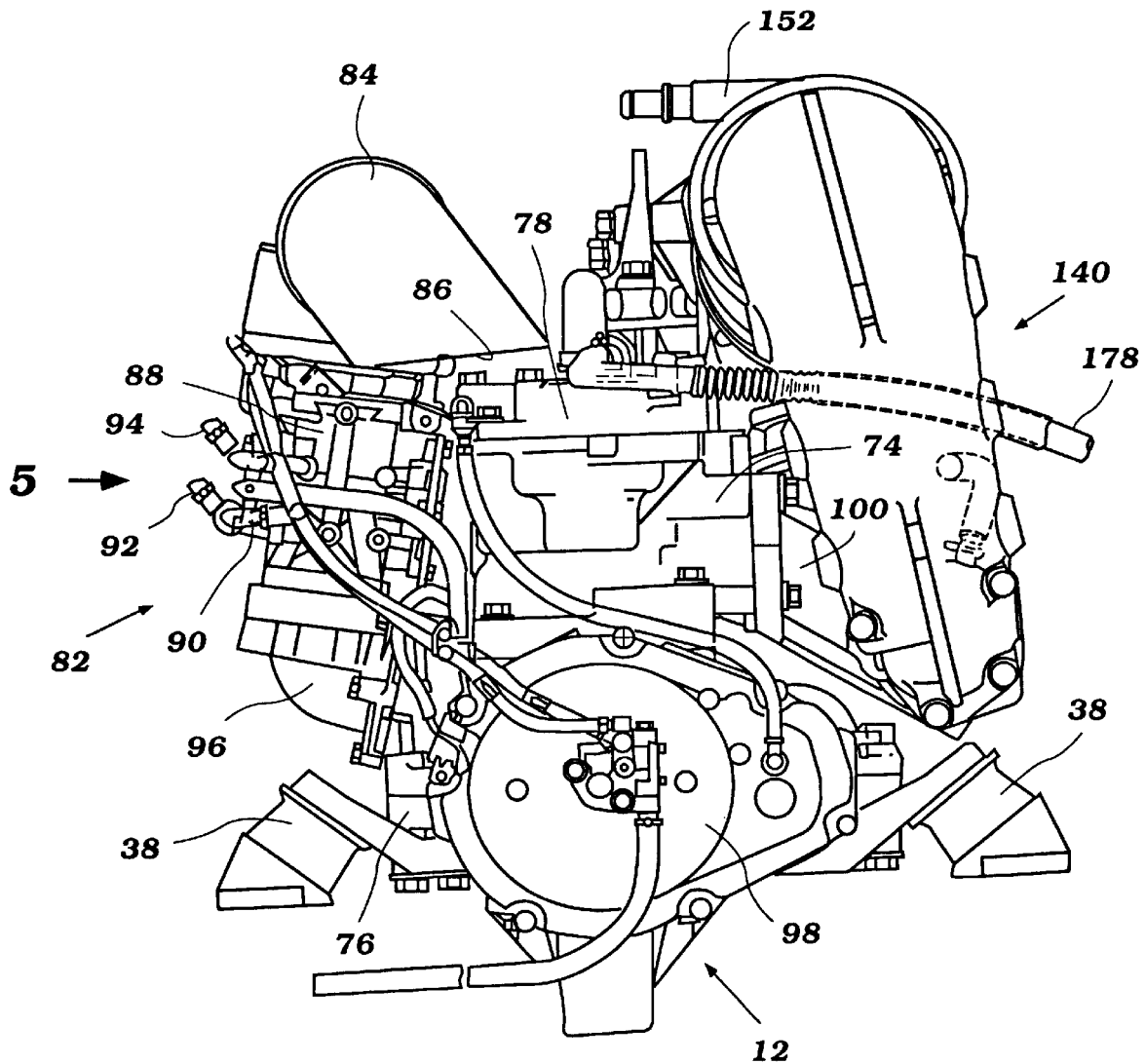
FIG. 3 is a front elevational view of the engine of FIG. 2.

As best understood in reference to FIGS. 1 and 2, the exhaust system 102 is provided to discharge exhaust byproducts from the engine to the atmosphere and/or to the body of water in which the watercraft 10 is operated. The exhaust system includes a C-shaped pipe section 140. This C-pipe 140 includes an inner tube 142 that communicates directly with the discharge end 114 of the exhaust manifold 100. An outer tube 144 surrounds the inner tube 142 to form a coolant jacket 146 between the inner and outer tubes 142, 144. Although not illustrated, the C-pipe 140 includes an inlet port positioned near its inlet end. The inlet port communicates with the water jacket 146.

The outlet end of the C-pipe 140 communicates with an expansion chamber 148. In the illustrated embodiment, the expansion chamber 148 has a tubular shape in which an expansion volume is defined within an annular, thick wall 150. Coolant jacket passages 152 extend through the expansion chamber wall 150 and communicate with the coolant jacket 146 of the C-pipe 140.

A flexible coupling 154 connects the outlet end of the C-pipe 140 to the inlet end of the expansion chamber 148. The flexible coupling 154 also includes an outlet port 156 which communicates with an internal coolant passage 157 within the flexible coupling 154. The coolant passage 154 places the coolant jacket 146 and the coolant passages 152 in communication.

The outlet end of the expansion chamber 148 is fixed to reducer pipe 158 which tapers in diameter toward its outlet 160. The pipe 158 has a dual shell construction formed by an inner shell 162 which defines an exhaust flow passage. The expansion volume communicates with this passage.

An outer shell 164 is connected to the inner shell 162 and defines a cooling jacket 166 about the inner shell 162. The coolant jacket passages 152 of the expansion chamber 148 communicate with the coolant jacket 166 of the pipe 158 to discharge a portion of the coolant with the exhaust gases.

The lower section of the reducer pipe 158 includes a downwardly turned portion that terminates at the discharge end 160. The inner shell 162 stops short of the outer shell 164 such that the water flow through the water jacket 166 merges with the exhaust gas flow through the exhaust passage at the discharge end 160.

A flexible pipe 168 is connected to the discharge end 160 of the reducer pipe 158 and extends rearwardly along one side of the watercraft hull tunnel 55. The flexible conduit 168 connects to an inlet section of a water trap device 170. The water trap device 170 also lies within the watercraft hull 16 on the same side of the tunnel 56.

The water trap device 170 has a sufficient volume to retain water and to preclude the back flow of water to the expansion chamber 148 and the engine 12. Internal baffles within the water trap device 170 help control water flow through the exhaust system 102.

An exhaust pipe 172 extends from an outlet section of the water trap device 170 and wraps over the top of the tunnel 56 to a discharge end 174. The discharge end 174 desirably opens into the tunnel 56 at an area that is close to or actually below the water level with the watercraft 10 floating at rest on the body of water.

An engine and exhaust cooling system is provided for cooling the engine and the exhaust system. The cooling system is formed in part by coolant passages and jackets described above in connection with the exhaust manifold and the exhaust system.

The cooling system supplies fresh cooling water to the inlet port 128 of the exhaust manifold 100. In the illustrated embodiment, the propulsion unit 50 supplies cooling water through a conduit 176 to an exhaust manifold cooling jacket 118, 120.

The cooling water passing through the exhaust manifold coolant passages 118, 120 flows into the cooling passages within the engine 12, as described above. The cooling water for the passages near the first cylinder 73a is then discharged through the first discharge port 136, and the cooling water for the passages near the second cylinder 73b is discharged through the second discharge port 138 on the cylinder head 78. A small amount of the cooling water passes through the second port 138 and into a telltale line 178. As telltale water, the water is discharged from a plate on the port side of the watercraft 10 in a position visible to the rider.

The majority of the cooling water flows through the first port 136 and into a conduit 180 which delivers the cooling water to water jackets 146 surrounding the exhaust pipe sections 140, 148, 158. The conduit 180 connects to the inlet port (not shown) of the C-pipe 140, located near the outlet end 114 of the exhaust manifold 100. The cooling water flow through the water jacket 146 of the C-pipe 140 and into the jacket 157 of the flexible coupling 154.

A portion of the cooling water is discharged through the outlet port 156 because too much cooling water in the exhaust stream tends to cause flow resistance. A conduit 182 carries the cooling water that is discharged through the outlet port 156 to the outlet end 174 of the exhaust pipe 172.

The balance of the cooling water flows through the jackets within the expansion chamber 148 and the reducer pipe 158. The cooling water merges into the exhaust gas stream at the discharge end 160 of the pipe 158, and flow into the flexible hose 168 toward the water trap 170. The cooling water is eventually discharged with the exhaust gases through the outlet end 174 of the exhaust pipe 172.

The first cylinder 73a tends to operate at a lower temperature than in prior engine due to the increased flow of coolant through the passages about the first cylinder 73a. The temperature of the first cylinder desirably matches that of the second cylinder 73a within at least 10 to 15 percent of the temperature of the second cylinder 73b. As a result, deterioration of rubber engine components (e.g., the engine mounts 38) about the engine block 74 is diminished, and the engine 12 is less susceptible to knocking.

The engine 12 can employ one or more of the following mechanism to reduce the temperature of the first cylinder 73a, in addition or in the alternative to supplying more coolant to the passages about the first cylinder 73a. The first cylinder 73a can be designed with a lower compression ratio than the second cylinder 73b. That is the ratio of the volumetric sizes of the variable-volume chamber of the first cylinder 73a when the associated piston in a bottom-dead-center (BDC) position and in a top-dead-center (TDC) position is less than the ratio of the volumetric sizes of the variable-volume chamber of the second chamber when the associated piston in a BDC position and in a TDC position. As a result, the power output by the first cylinder is reduced and less heat is generated by the first cylinder.

The ignition timing of the first cylinder 73a also can be retarded. That is, the ECU can instruct the ignition controller to fire the spark plug 80 of the first cylinder 73a after the ignition controller causes the spark plug 80 of the second cylinder 73b to fire. For instance, the ignition controller can fire the second cylinder 73b when the associated piston is at a 20E before top-dead-center position and can fire the first cylinder 73a when the associated piston is at an 18E before top-dead-center position. The retardation of the ignition in the first cylinder 73a provides less time for the combustion to occur, and consequently complete combustion of the fuel charge does not happen. As a result, the power output by the first cylinder 73a is reduced and less heat is generated by the first cylinder 73a.

Each of these methods of evening the temperatures in the two cylinders effectively reduces the temperature of the first cylinder in reference to the second cylinder, without meaningfully affecting the operation of the second cylinder. That is, the methods do not alter in any substantial way the performance of the second cylinder. The temperature and the power output of the second cylinder remains generally the same as that in a similar engine without a temperature evening means. The latter two methods, however, reduce the overall power of the engine by affecting the performance of the first cylinder. It is contemplated that those skilled in the art will be able to readily employ these means of reducing cylinder temperature, either separately or together, in order to obtain desired operating characteristics for the engine.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A multi-cylinder engine for a small watercraft comprising a first variable-volume combustion chamber and a second variable-volume combustion chamber, an exhaust manifold communicating with both the first and second combustion chambers, the exhaust manifold including a first runner and a second runner, the first runner communication with the first variable-volume chamber and the second runner communicating with the second variable volume chamber, and means for reducing the temperature of the first runner in comparison to the second runner.

2. An engine as in claim 1, wherein the first and second runners have different lengths.

3. An engine as in claim 1, wherein the first and second runners have different shapes.

4. A multi-cylinder engine for a small watercraft comprising a fist variable-volume combustion chamber and a second variable-volume combustion chamber, an exhaust manifold communicating with both the first and second combustion chambers, the exhaust manifold including a first runner and a second runner the first variable-volume combustion chamber exhausting into the first runner upstream of the point where the second variable-volume combustion chamber exhausts into the second runner, and a cooling system including at least a first coolant passage extending adjacent to the first runner and a second coolant passage extending adjacent to the second runner, an inlet port communicating with the first and second coolant passages, and a flow regulator which produces a larger coolant flow rate through the first coolant passage than through the second coolant passage, the flow regulator being located between the coolant inlet port and the first and second coolant passages.

5. An engine as in claim 4, wherein the flow regulator includes a first orifice which lies upstream of the first coolant passage and a second orifice which lies upstream of the second coolant passage, the first orifice being larger than the second orifice.

6. An engine as in claim 1, wherein the second runner is arranged to merge into the first runners.

7. An engine as in claim 6, wherein a plurality of coolant passages extend adjacent to the first and second runners.

8. An engine as in claim 7, wherein the total volume of the coolant passages which are contiguous with the first runner is greater than the total volume of the coolant passages which are contiguous with the second runner.

9. An engine as in claim 4, wherein the first and second coolant passages are formed within the exhaust manifold, and the coolant inlet port is disposed on an exterior of the exhaust manifold.

10. An engine as in claim 9, wherein the flow regulator is located within the exhaust manifold.

11. An engine as in claim 10, wherein the flow regulator includes a first orifice which lies upstream of the first coolant passage of the exhaust manifold and a second orifice which lies upstream of the second coolant passage of the exhaust manifold, the first orifice being larger than the second orifice.

12. A method of maintain generally equal temperatures within at least two cylinders of a multi-cylinder engine comprising the steps of cyclically providing a fuel/air charge to first and second cylinders of the engine, cyclically burning the fuel/air charge in the first cylinder and in the second cylinder, cyclically porting combustion byproducts to an exhaust manifold such that the first cylinder exhausts into a first exhaust manifold runner upstream of a second exhaust manifold runner which communicates with the second cylinder, and reducing the operating temperature in the first exhaust manifold runner to generally match or to be lower than the temperature of the second exhaust manifold runner.

13. A method as in claim 12, wherein reducing the temperature of first exhaust manifold runner involves providing a greater coolant flow through a first cooling passage adjacent to the first exhaust manifold runner than through a second cooling passage adjacent to the second exhaust manifold runner.

14. A method as in claim 13, wherein a greater coolant flow in the first cooling passage is produced by restricting the coolant flow through the second passage in comparison to the first cooling passage.

* * * * *

UNITED STATES PATENT AND TRADEMARK OFFICE
CERTIFICATE OF CORRECTION

PATENT NO. : 6,109,220
DATED : August 29, 2000
INVENTOR(S) : Mitsuyoshi Nakamura It is certified that error appears in the above-identified patent and that said Letters Patent is hereby corrected as shown below:

Column 10,
Line 61, change "communication" to -- communicating --

Column 11,
Line 4, change "fist" to -- first --

Signed and Sealed this

Fifth Day of October, 2004

JON W. DUDAS
*Director of the United States Patent and Trademark Office*